United States Patent [19]

Ottenheimer

[11] Patent Number: 4,921,411
[45] Date of Patent: May 1, 1990

[54] GLASS REPAIR INJECTOR TUBE NOZZLE ADAPTER

[76] Inventor: Charles J. Ottenheimer, 1128 Ala Napunani, Suite #1105, Honolulu, Hi. 96818

[21] Appl. No.: 365,299

[22] Filed: Jun. 13, 1989

[51] Int. Cl.[5] .................... B32B 35/00; B29C 45/14
[52] U.S. Cl. .................................. 425/12; 156/94; 425/13
[58] Field of Search .................. 425/12, 13; 156/94

[56] References Cited

U.S. PATENT DOCUMENTS

| | | | |
|---|---|---|---|
| 3,988,400 | 10/1976 | Luhman | 425/12 |
| 4,047,863 | 9/1977 | McCluskey et al. | 425/12 |
| 4,132,516 | 1/1979 | Story | 425/12 |
| 4,249,869 | 2/1981 | Petersen | 425/12 |
| 4,419,305 | 12/1983 | Matles | 425/12 |
| 4,597,727 | 7/1986 | Birkhauser | 425/12 |
| 4,681,520 | 7/1987 | Birkhauser | 425/12 |
| 4,753,695 | 10/1988 | Alexander et al. | 425/12 |
| 4,775,305 | 10/1988 | Alexander et al. | 425/12 |
| 4,776,780 | 10/1988 | Banks | 425/12 |
| 4,814,185 | 3/1989 | Jones | 425/13 |
| 4,826,413 | 5/1989 | Mantles | 425/13 |

*Primary Examiner*—Willard Hoag
*Attorney, Agent, or Firm*—Quirk, Tratos & Roethel

[57] ABSTRACT

A guide for fluid injection system for repairing chips or cracks in glass has a flat surface having regular markings thereon so that an operator can determine visually when the crack has been filled with fluid. The guide is preferably a cylindrical block having a central opening for receiving the injector, and the markings are preferably surface depressions, e.g., concentric circles.

20 Claims, 2 Drawing Sheets

GLASS REPAIR INJECTOR TUBE NOZZLE ADAPTER

BACKGROUND OF THE INVENTION

The present invention relates to a device and method for repairing chipped glass and more particularly to a device and method for repairing and re-repairing a laminated glass, e.g., an automobile windshield, that is chipped by a stone or similar projectile.

The repair of stone-chipped laminated glass is an established art. The financial savings from repairing damaged laminated glass, rather than replacing it, has created a well established market for equipment, materials and new repair methods.

Laminated glass generally consists of three layers. The first and third layers consist of glass panes, which are usually of a safety variety. The second layer is a layer of plastic which separates or is sandwiched between the layers of glass. Generally, if the glass incurs stone-chip damage, usually only the impacted layer of glass is damaged. The stone-chip damage is generally one of two types: (1) a circular or "bulls-eye" break or (2) the so called "star" break which is a break that resembles a star because of its multiple radiating cracks. The impact point of the stone or the projectile on the glass is referred to as "a pit." If the pit is smooth to the touch, it is called a "small" pit. If the pit is rough to the touch because pieces of the fractured glass have been knocked out of the impact point, the pit is then referred to as a "large" pit.

Stone-chipped laminated glass is typically repaired by forcing a repair material, e.g., a liquid resin which has an index of refraction approximately equal to that of the glass, into the break at high pressure. Presently, a windshield repair apparatus supporting an injector which has a means for sealing around the break is utilized to inject the liquid resin into the crack. Such an apparatus is shown in U.S. Pat. No. 3,993,520 and U.S. Pat. No. 4,291,866. Essentially, a windshield repair apparatus comprises a unitary frame assembly which has a plurality of support legs, a suction cup assembly and a crank assembly. The unitary frame further includes a stanchion which supports an injector tube which has a means for sealing at the discharge end or that end of the tube that comes in contact with the glass.

In prior art processes, the repair process begins by probing the pit with a carbide or diamond tip scraper to knock off and flex any excess glass and to make the glass receptive to the resin. In some instances, a very small drill was used to create a small hole into the glass. The depth of the hole was usually slightly greater than the width of the impacted glass layer. If this scraping or drilling was not carefully done, the repair created unwanted additional surface scratches. Commonly, the drill actually entered the plastic layer between the two layers of the glass. The entry into the plastic layer by the drill caused a scar in the plastic which was visible after completion of the repair. In addition, careless scraping or drilling break edges off the pit, thereby leaving repair scars after the repair job is complete.

After the pit was prepped, a repair apparatus was mounted directly onto the glass windshield through the use of suction cups in such a manner that the injector tube was directly over the pit. When the unit was properly aligned, it was sufficiently locked into place so that the pressure necessary to inject the resin did not move the apparatus. The injector tube was then tightened against the windshield so that an adequate seal was formed to maintain the pressure on the injected resin. A syringe inserted into the injector tube injected the repair resin into the break. After an adequate amount of resin has injected, the syringe was withdrawn and a manual pump was inserted into the injector tube. As the pump is driven into the injector tube, a positive pressure was exerted on the resin, forcing the resin into the cracks of the break. As the pump was withdrawn a negative pressure was created which drew air pockets of the break. The repeated insertion and removal of the pump into and out of the injector tube eventually drew all of the air out of the break.

One drawback with the old method of repairing laminated glass, however, was that the repairer could not readily determine when the cracks of the break were completely filled with resin. This determination was further hampered by the fact that the repairer worked under an ultraviolet inhibitor or cover because most resins harden when subject to ultraviolet radiation. Consequently, the quality of the repair of the glass was often unsatisfactory and/or required break of the repair to be repaired again. Both scenarios evidence the relative inefficiency of repairing automobile windshield, or laminated glass in general, by the old method.

It would be highly advantageous therefore, to remedy the foregoing and other deficiencies and inherent limitations associated with the apparatus and method for repairing a star or bull's-eye crack in automobile windshields.

Accordingly, it is a principal object of the present invention to provide the repair person a means for providing a reference to determine the extent the repair resin or material fills the cracks of the break. A further object of the present invention is to allow the progress of the repair to be better monitored and quickly give the repair person indications as to any part of the break that is not accepting the repair process so that proper measures can be implemented for the speedy completion of the break.

It is a further object of the present invention to provide the repair person with a means for preventing additional scratches or scars when the pit is being prepared.

It is a further object of the present invention to provide a nozzle adapter that adapts to the injector tube that has reference indicators or a series of regular markings that provide a reference to determine the extent the repair resins fills the cracks of the break.

A further object of the present invention is to provide different sized nozzle adapters that can be used for repairing small pit repair and/or converted to repairing large pits. It is a further object of the present invention to provide a nozzle adapter that hold specialized tools in such a firm fashion as to not allow them to break down the edges of the pit and/or cause additional scratches.

It is a further object of the present invention to employ an inspection mirror that magnifies the break, thereby giving the repair person a better vantage point and view of the progress of the repair, thus facilitating a more effective and efficient repair.

It is a principal object of the present invention to provide a new method for repairing laminated glass by utilizing a nozzle adapter having a tool guide for guiding specialized tools that aids the repair person in the preparation of repairing a break of a laminated glass. It is another principal object of the present invention to provide a method for re-repairing laminated glass or windshields that were previously poorly repaired or whose resin material has caused blemishes or scars in the windshield.

It is a further feature of the present invention to provide a conduit for repair resin materials to flow into the break under hydraulic pressure created by the pump. It is a further feature of the present invention to provide injector tube nozzle adapters of different dimensions in order to repair large pits or small pits at the very edges of automobile windshields or on the curved portion of automobile windshields. It is an advantage of the present invention to provide a nozzle adapter that facilitates as a platform for the insertion of specialized tools to repair the pit without creating further scratches or breaks in the edge of the pit. It is a further feature of the present invention to use a magnifying mirror that permits the repairer to determine whether the trailing edges of cracks that are difficult to see by the naked eye are being filled up with repair resin.

The foregoing and more specific objects, the advantages and features of the present invention will become readily apparent to those skilled in the art in the following detailed description of the preferred embodiments and methods thereof taken in conjunction with the drawings.

BRIEF SUMMARY OF THE INVENTION

The glass repair injector tube nozzle adapter of the present invention attaches to the end of an injector tube, mounted on the glass by a windshield repair apparatus which is affixed to the glass by one or more suction cups. The face of the nozzle adapter has a central conduit for permitting the flow of resin into the break. The front first surface of the nozzle also has reference indicators that provide a reference to determine the extent the resin fills the cracks of the break. In addition, the nozzle has at least one means for sealing the nozzle against the surface of the glass.

In addition, the glass repair injector tube nozzle adapter of the present invention provides a means for guiding tools that are utilized to prepare the pit to receive resin and to reopen prior unsatisfactory repairs to properly and satisfactorily re-repair it.

In other variations of the nozzle, there is an inner and outer seal and in another variation there is a seal but no regular reference indicators. Each of the variations are designed to snugly fit on the discharge end or nozzle of the injector tube.

The method for repairing stone-chipped laminated glass of the present invention comprises mounting the windshield repair apparatus, which supports the injector tube having the nozzle adapter of the present invention attached thereto, on the laminated glass. Then, a specifically designed tool for the particular type of break in the laminated glass, i.e., a bull's-eye break or a star break, is inserted to prepare the pit for receiving resin material by tapping the tool into the pit at least twice. Next, a repair resin-filled syringe is inserted into the injector tube and the resin is injected into the break. Then a pump is manually inserted and removed into and from the injector tube, whereby negative and positive pressure forces the resin into the pit and cracks of the break while withdrawing the air from the break until all the cracks are filled.

In the case of laminated glass the repair person determines the completeness of repairs by the use of reference indicators on the nozzle adapter of the present invention. This determination if further enhanced by the use of a magnifying inspection mirror adhered to the opposite side of the laminated glass and under the break.

If the reference markings indicate that some cracks of the break are not being filled, the repair person may repeat the steps of inserting the specifically designed tools into the injector tube to further open the cracks to receive the repair resin and then utilizing the pump. Moreover, the method of the present invention may be employed to reopen prior unsatisfactory repairs or deteriorating repairs to re-repair them and also repair similar chipped non-glass materials and/or objects, such as sculptures.

DETAILED DESCRIPTION OF THE PREFERRED EMBODIMENTS AND METHODS

Figure 2:
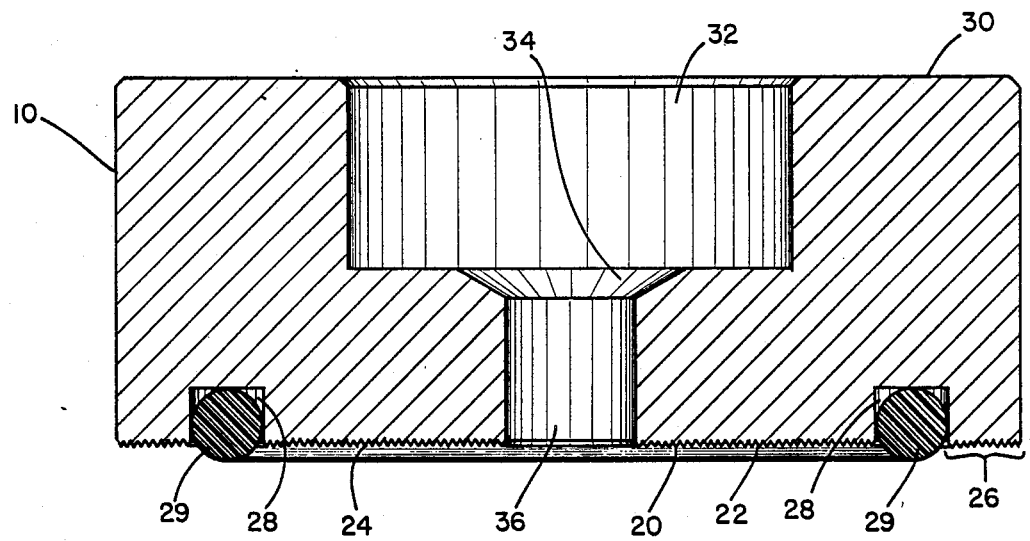
FIG. 2 is a cross-sectional view of the glass repair injector tube nozzle adapter.
Figure 3:
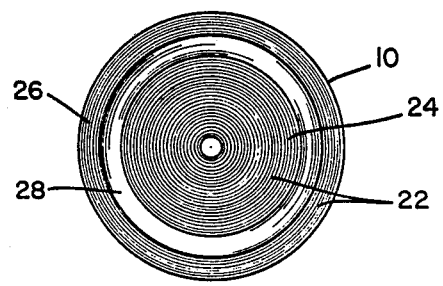
FIG. 3 is a front view of one variation of the glass repair injector tube nozzle adapter.

The glass repair injection tube nozzle adapter or guide member of the present invention is shown in FIGS. 2 and 3. In the preferred embodiment of the present invention, the shape of the adapter 10 is cylindrical, however, the shape of the adapter 10 can be of any geometric cross-section. The adapter 10 comprises a first generally flat surface 20 having a plurality of reference indicators 22 on its surface. In the preferred embodiment of the present invention, the reference indicators 22 are a plurality of regularly spaced shallow concentric grooves that radiate from the center of the surface 20. The grooves are milled, but may be cast, molded or otherwise placed on the surface 20. While concentric grooves are a preferred embodiment, the reference indicators can be regular markings that are painted, etched, drawn, or put on a different medium e.g., in the form of a decal or a label, and then adhered to the surface 20 of the adapter 10, although surface irregularities or depression are preferred as they provide superior visibility. Moreover, the indicators 22 do not have to be circular in shape. The indicators 22 may be of any geometric design that enables the repairer to use one surface as a reference to determine the extent resin fills the cracks of a break in laminated glass. The concentric regularly spaced markings shown in FIG. 3, however, are preferred because they are best suited to contrast with the non-circular concentric cracks of the bull's-eye break and the radiating arms of the star break so that the repairer may determine the extent the repair resin is filling the cracks.

FIG. 3 also shows a groove 28 for a seal member 29. Any pliable, resilient seal of any geometric cross-section which can retain resin and air under both positive and negative pressure is permissible. It is very important for the seal to prevent outside air to enter when the pressure is negative because air bubbles in the resin after it hardens will cause noticeable imperfections or blemishes in the glass. The groove 28 also separates the surface 20 of the adapter 10 into a group of inner indicators 24 and outer indicators 26. In additions, even though the seal 29 is compressed when the repairs are being made, a small reservoir is created between the first surface 20 bounded by the seal 29 and the surface of the laminated glass over the pit. Preferably, the seal 29 is an O-ring.

The O-rings act as a soft buffer when compressed against the glass and also forms a resin holding seal around the pit and a reservoir of repair resin between the first surface and the glass. This reservoir of resin can be pumped into the break at a later time.

FIG. 2 is a cross-sectional view of the adapter 10 which shows the seal 29 residing in the groove 28, the inner indicators 24 and the outer indicators 26 on the surface 20. In addition, FIG. 2 shows a second surface 30 having a central opening called the injector breach 32. The injector breach 32 may be bored, milled or cast, and is centered on surface 30. The injector breach 32 may be of any geometrical cross-section as long as it geometrically matches the circumference of the injector tube 64. As shown in FIG. 2, the depth of the breach 32 is less than the width of the adapter 10.

At the bottom of the breach 32 is a chamfered tool guide, 34 having sloped sidewalls, which is concentrically aligned with the injector breach 32 and having a diameter substantially less than the diameter of the injector breach 32.

The diameter of the injector breach 32 is slightly larger than the diameter of the injector tubes 64 discharging end or nozzle so that the pressurized repair resin or other material does not leak out of the injector breach 32. Although the injector tubes 64 nozzle snugly fits into the injector breach 32 at the completion repair process, the adapter 10 can be easily pried off the injector tube 64 by finger pressure. The inner walls of the guide 34 slant inwardly reducing the diameter of the guide 34. This beveled portion directs specialized tools, inserted into the injector tube 64, into the adapter conduit 36. The guide 34 may be bored or drilled.

The adapter conduit 36 is concentrically aligned with the breach 32 and guide 34. The diameter of the adapter conduit 36 is equal to the smaller diameter of the guide 34. The adapter conduit 36 may be bored or milled and goes completely through the first surface 20 of the adapter 10. The adapter conduit 36 channels the flow of the resin into the pits and cracks of the break. More importantly, the diameter of the adapter conduit 36 is of a predetermined size to slidably receive specialized tools that are used in the method of the present invention to repair stone-chipped laminated glass, as is described below.

The adapter conduit 36 may be of any geometrical cross-section as long as it geometrically matches the geometric shape and circumference of the specialized tools.

Figure 1:
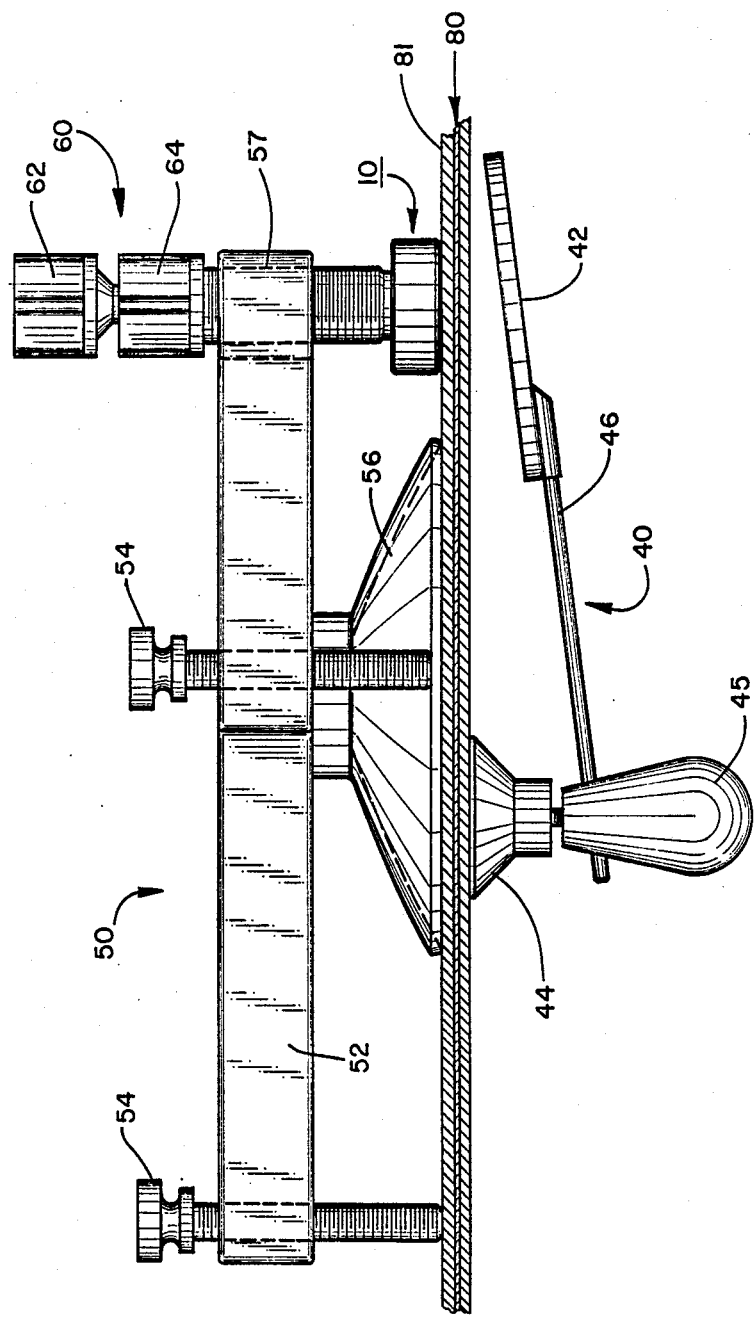
FIG. 1 shows a perspective view of the glass repair injector tube nozzle adapter of the present invention attached to the injector tube, supported by the windshield repair apparatus.

As shown in FIG. 1, the adapter 10 is attached to the injector tube 64, or in the alternative, the injector tube 64 is inserted into the injector breach 32 of the nozzle 10, after the injector assembly 60 has been mounted on the stanchion 57 of the assembly frame 52 of the repair apparatus 50.

The adapter or guide member 10 of the present invention shown in the drawings is one variation of the preferred embodiment of the present invention. The present invention contemplates three variations. The repair person uses one of the variations, depending on the size of the break and where it is located on the laminated glass or automobile windshield. The variation of the disclosed embodiment referred to above is called a "large pit adapter". This adapter is used by the repair person when the pit is large and/or when the severity of the break requires a large first surface area 20 which has reference indicators 22 so that the repair person has a broader frame of reference to determine the extent of resin fills the cracks. The other two variations are called the "special purpose nozzle adapter" and the "universal nozzle adapter".

The three nozzle variations are similar in the following respects: each has a generally flat surface with regular markings thereon, an injector tube breach, a tool guide and an adapter conduit, all of which perform the same function and/or serve the same purpose as described above. Moreover, each variation has the ability to create a resin-retaining seal that withstands both positive and negative pressures induced by the manual pump 62, thus precluding air bubbles from forming in the break.

The universal nozzle adapter (not shown) has a preferred shape similar to adapter 10 shown in the drawings. The first surface of the universal nozzle adapter has two concentrically aligned seals or "O" rings, which divide up the first surface into three areas of reference markings. The universal nozzle is used on all parts of the glass except the curved portions and damaged areas on the very edge of the glass where the size and shape of the adapter would preclude the capability of creating the required resin retaining seal. The universal nozzle is a combination of the wide pit adapter and the special purpose adapter.

In operation, if the universal nozzle is used on the large pits, the inner O-ring is removed. If the universal nozzle is used on the small pits, the outer O-ring can be left in place depending on the desire of the repair person, who may need more extensive first surface area having indicators in order to give him a broader reference to determine the extent the resin fills the cracks.

The last variation, the special purpose nozzle adapter, has a substantially reduced first surface area. The first surface has a single O-ring which surrounds the adapter conduit. There are no reference indicators on the first surface area of the special purpose adapter, thus it is not typically used by the repair person who desires a reference to determine the extent the resin fills the cracks. In operation, the special purpose adapter is used when the damaged area is at the very edges or on the curved portions of the glass or automobile windshield. In these situations a large pit or universal adapter would be functionally inappropriate, since a proper seals could not be obtained.

All of the variations of the glass repair injector tube nozzle adapter 10 of the present invention accept the specially designed tools that are utilized in the steps of the windshield repair method of the present invention. Previously, the old repair process began by probing the damaged area of the laminated glass by using a carbide or diamond tipped scraper to knock off any excess glass and make the glass receptive to be sealed and receive the repair material. Another preparatory method was to drill a very small hole into the damaged layer of the glass to the plastic layer. The method of the present invention circumvents much of this type of repair preparation.

Assuming that the break is on a flat portion of the laminated glass, the first step is to attach an inspection mirror assembly 40 on the opposite side of the glass 80, as shown in FIG. 1. Typically, the inspection mirror assembly 40 is composed of a suction cup 44, a support handle 45, a mirror arm 46, and a magnifying inspection mirror 42. The mirror 42 facilitates observation of the back side of the break to determine the extent of the break. In addition, this magnified backside perspective reveals the trailing edges of cracks and/or cracks that are difficult to see with the naked eye.

These three specifically designed tools can be used during the preparatory step of the method of the present invention or after the introduction of resin into the pit. The first tool is called a bull's-eye probe A bull's-eye probe is a punch-like device with a long shaft that reaches all the way through the adapter conduit 36 and emerges outside the first surface 20 of the adapter 10. The diameter of the shaft is slightly less than the diameter of the adapter conduit 36. The geometrical match facilitates little or no lateral play, of the bull's-eye probe's shaft when it is being used. Once the bull's-eye probe in inserted in the injector tube 64 and adapter conduit 36 so that the point of the bull's-eye probe is in contact with the pit, the repair person taps the end of the probe at least twice. This opens up the pit and permits the resin to enter the break. Moreover, no careless scratches or broken edges are created because the dimensional mating of the adapter conduit 36 and shaft of the bull's-eye probe direct the point of the bull's-eye probe to one specific area perpendicular to the glass and prohibit any lateral movement which can cause scratches or breaking of the edges of the pit, causing scars or poor repairs.

If the damaged area is a star break, then the repair person uses a specialized tool called a drilling probe or punch. The drilling probe or punch is a tool created from manufactured dental equipment. The shaft of the probe is very thin and is used for entering a pre-drilled hole in the break at the center of the pit. The drilling probe in inserted into the injector tube 64 and nozzle 10 and into the pit. The top of the probe is then tapped at least twice. The tapping of the probe creates a hole to the plastic layer and a small crack between the bottom of the hole and plastic layer beneath the damaged plane of glass 81. Also, the tapping opens up all of the extended "arms" of the break.

In the past, star cracks were completely drilled through until the drill actually entered the plastic layer between the two layers of the glass. The entry into the plastic layer by the drill caused a scar in the plastic which was visible after completion of the repair. The drilling probe as used int he method of the present invention leaves no scar in the plastic because only a very sharp point puncture is created in the plastic instead of a large drill mark.

After the drilling probe is used, the repairer used the star-break probe. The star-break probe is similar to the bull's-eye probe; but instead of having a carbide or diamond dust tip, the star-break probe has a milled tip with sloping shoulders of between 30 and 60 degrees from the longitudinal axis of the shaft, to a point at the end. Like the bull's-eye probe, the shaft of the star-break probe has a diameter slightly less than the diameter of the adapter conduit 36 so that there is little or no lateral play when the star break-probe is inserted into the injector tube 64 and adapter 10. After the star-break probe in inserted into the injector tube 64 and adapter 10 so that the point of the probe is inserted into the pit, the top of the probe is tapped at least twice. As the probe is tapped into the center of the star break, the shoulders of the probe spread the star a little bit from the center and outside the arms so that the cracks on the edge of the star break spread slightly allowing them to accept the resin that will be injected. Because the star-break probe has no lateral play when it is in the injector tube 64 and nozzle 10 no careless scratches or broken edges of the pit result. The dimensional mating of the star-break probe and the adapter conduit 36 restrict the impact of the star-break probe point to only one spot and at only one angle. This angle is typically 90 degrees to the surface of the glass 80.

After any of the above probes are used in the fashion so described, they are removed from the injector tube assembly 60, the pump 62 is reinserted into the injector tube 64 and manually driven into and withdrawn out of the injector tube 64. The piston-like action forces the resin to the furthest edges of the cracks.

The repair person can determine the progress of the repairs by observing the fluid entering into the cracks by looking into the inspection mirror. If the repair person is using a nozzle which has reference indicators on its first surface, then the repair person will be able to use these indicators as a contrasting background or reference, enabling the repair person to "see" the cracks disappear as the resin enters into the cracks.

What the repair person sees can be described as a "hologram effect". Because the cracks of the break are in a clear medium, the reference indicators 22 on the first surface 20 of the adapter 10 act like a backdrop which creates an appearance that the break and its cracks are suspended in front of the surface 20 of the adapter 10. This image is similar to the three dimensional image that is created by looking into a hologram.

Continued pump action draws out the air pockets inside the break. The air pockets rise up into the injector tube 64 above the resin. The air pocket that is subsequently created above the resin contributes to the hydraulic pressure that is exerted upon the resin, forcing it into the cracks of the breaks.

If there are some parts of the break that do not respond to the repair, this should be readily seen by the repair person who utilizes an adapter having reference indicators on the first surface 20. In this event, the repair person may reinsert the drilling probe enters the desired portion of the damaged area. The repair person then taps the top of the probe to create a vibration which opens the slow filling or nonfilling cracks. The diameter of the drilling probe's shaft, being substantially smaller that the adapter conduit 36, permits the point of the drill to be directed all around the periphery of the pit in order to open cracks of a bull's-eye break or the arms of a star break before or after the adding of resin.

The same steps of the method to repair a laminated glass of the present invention can also be employed to repair laminated glass, i.e., automobile windshields, where the previous repairs were improperly made or where the resin in the old break shrank after the repairs were completed. In such an event the area to be re-repaired is treated like a star break. After the inspection mirror and windshield repair apparatus are properly oriented and attached to the glass, the drilling probe in inserted into the injection assembly and directed to the points that are desired to be loosened or opened up. With the tip at the desired portion of the break, the repair person taps the end thereby loosening and/or opening the break in order for it to receive the resin. If necessary this process is repeated after the resin is injected into the previously repaired area. The repair person uses the star break as described above and then injects the resin into the reopened break.

The method of the present invention herein described may also be employed to repair breaks or cracks in other types of materials such as sculptures or building facades. Obviously, when the adapter of the present invention is employed in this regard the indications on the first surface are inapplicable. Thus, only the adapter's 10 capability to guide and direct tools into the break and the steps connected thereto all is utilized when the method of the present invention is employed to repair such sculptures, other words of art or ornamental facades of buildings.

While the glass repair injector tube nozzle adapter has been illustrated with respect to one specific embodiment thereof and further variations described, these embodiments and variations should be considered illustrative rather than limiting. Although a number of specific dimensions have been mentioned they are not necessarily critical to the invention. Moreover, while the method of repairing laminated glass of the present invention has been described with respect to specific types of breaks, the description of the method should be considered as illustrative rather than limiting. Various modifications and additions to the glass repair injector tube nozzle adapter and method may be made and will be apparent to those skilled in the art. Accordingly, the invention should not be limited by the foregoing description, but rather should be defined only by the following claims.

I claim:

1. A guide for an injector nozzle for injecting fluid under pressure into cracks in a glass surface comprises
   a block guide member having an upper surface and a generally flat bottom surface,
   a centrally located conduit extending from the bottom surface to the top surface,
   seal means mounted on a lower portion of the guide member for retaining fluid injected by the nozzle and
   a plurality of regular markings on the bottom surface of the guide member.

2. The guide of claim 1 wherein the regular markings comprise a plurality of concentric circles.

3. The guide of claim 1 wherein the regular markings comprise a plurality of surface depressions into which fluid can flow during repair of the glass surface.

4. The guide of claim 1 wherein the regular markings comprise a plurality of milled concentric grooves.

5. The guide of claim 1 wherein the block guide member is generally cylindrical.

6. The guide of claim 1 wherein the centrally located conduit has upper and lower portions having circular cross-sections, the upper portion having a greater diameter than the lower portion.

7. The guide of claim 6 wherein the centrally located conduit also has an intermediate portion having sloped sidewalls.

8. The guide of claim 1 wherein a lower portion of the conduit is circular in cross-section, and the seal means comprises a resilient member mounted concentric to the conduit, and wherein at least a portion of the regular markings on the bottom surface extend between the conduit and the seal means.

9. The guide of claim 8 wherein the seal means comprises at least one O-ring.

10. The guide of claim 8 wherein at least a portion of the regular markings on the bottom surface extend radically along the bottom surface outside of the seal means.

11. In an apparatus for repairing cracks in glass by injecting a fluid under pressure into the cracks, the apparatus including a frame, a plurality of mounting members including suction means for attaching the frame to the glass to be repaired, and a fluid injector removably mountable on the frame, the improvement therein comprising a guide member having an upper surface and a generally flat bottom surface, a centrally located conduit extending from the bottom surface to the top surface of the guide member for receiving the fluid injector, seal means mounted on a lower portion of the guide member for retaining fluid injected by the fluid injector and a plurality of regular markings on the bottom surface of the guide member.

12. The guide of claim 11 wherein the regular markings comprise a plurality of concentric circles.

13. The guide of claim 11 wherein the regular markings comprise a plurality of surface depressions into which fluid can flow during repair of the glass surface.

14. The guide of claim 11 wherein the regular markings comprise a plurality of milled concentric grooves.

15. The guide of claim 11 wherein the block guide member is generally cylindrical.

16. The guide of claim 11 wherein the centrally located conduit has upper and lower portions having circular cross-sections, the upper portion having a greater diameter than the lower portion.

17. The guide of claim 16 wherein the centrally located conduit also has an intermediate portion having sloped sidewalls.

18. The guide of claim 11 wherein a lower portion of the conduit is circular in cross-section, and the seal means comprises a resilient member mounted concentric to the conduit, and wherein at least a portion of the regular markings on the bottom surface extend between the conduit and the seal means.

19. The guide of claim 18 wherein the seal means comprises at least one O-ring, and the guide member also comprises channel means for mounting said seal means.

20. The guide of claim 18 wherein at least a portion of the regular markings on the bottom surface extend radially along the bottom surface outside of the seal means.

* * * * *